May 2, 1944.  L. P. ELLIOTT ET AL  2,347,999
REACTION OF HYDROCARBONS
Filed Dec. 2, 1940
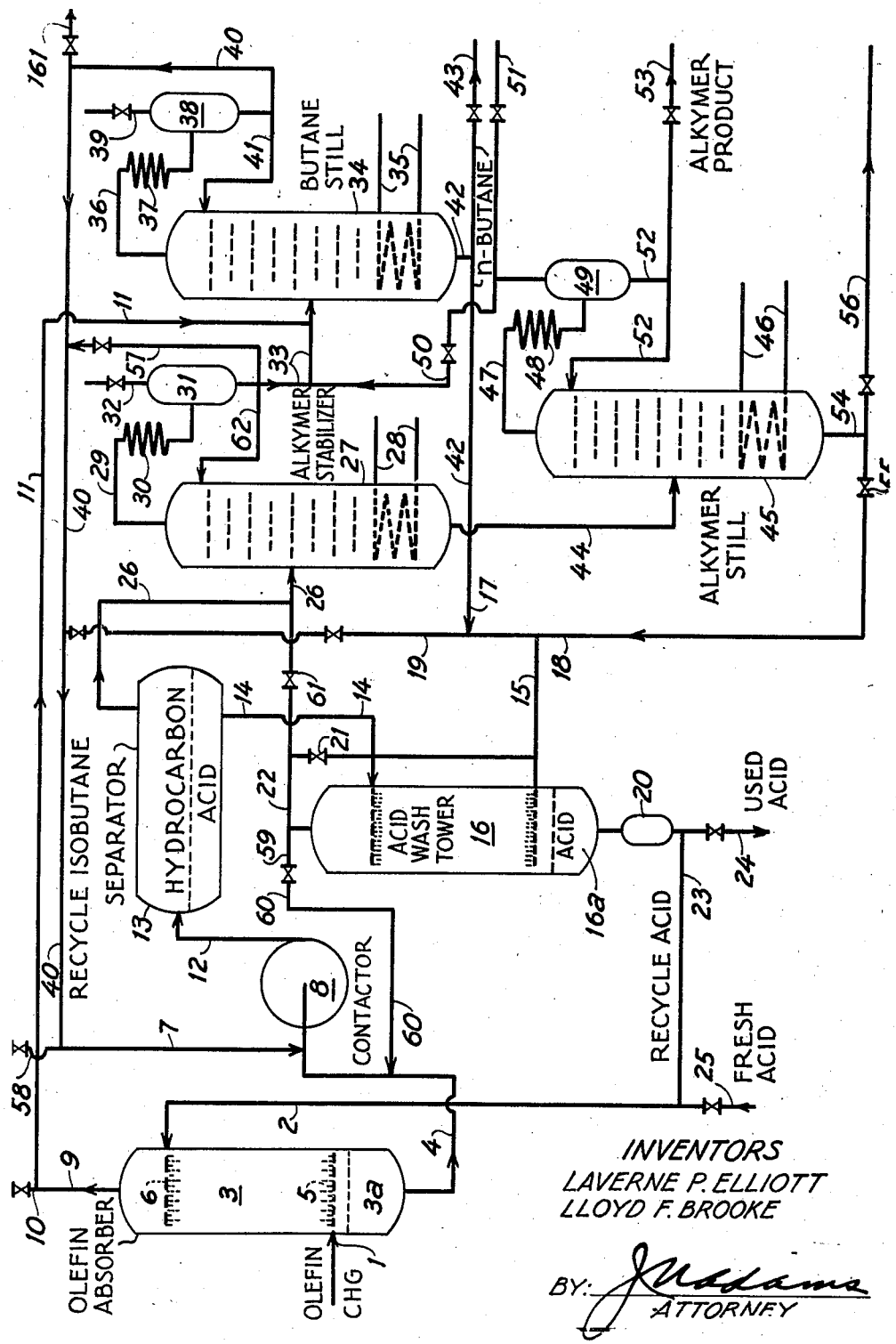
INVENTORS
LAVERNE P. ELLIOTT
LLOYD F. BROOKE
BY: J. Adams
ATTORNEY Patented May 2, 1944

2,347,999

UNITED STATES PATENT OFFICE 2,347,999

REACTION OF HYDROCARBONS

Laverne P. Elliott, Berkeley, and Lloyd F. Brooke, Berkeley Highland Terrace, Calif., assignors to Standard Oil Company of California, San Francisco, Calif., a corporation of Delaware Application December 2, 1940, Serial No. 368,134

3 Claims. (Cl. 260—683.4)

This invention relates to an improved process for the alkylation of isoparaffins, and more particularly to a process wherein said isoparaffins are alkylated by means of an alkylated acid for the production of higher boiling isoparaffins suitable for use in liquid motor fuels of high antiknock value and for other uses.

It has previously been disclosed that the isoparaffinic hydrocarbons, such as isobutane and isopentane, may be caused to react with the olefins of lower molecular weight, such as propylene, the butenes and the pentenes, by means of liquid acid catalysts, such as concentrated sulfuric acid. The products of this reaction correspond in substantial part to the union of one molecule of isoparaffin with one molecule of olefin. This reaction is herein referred to as one of "alkylation" and the products are called "alkymers." The alkymer mixtures produced from the isoparaffins containing less than six carbon atoms per molecule and the normally gaseous olefins have a high antiknock value and a high degree of saturation and are therefore particularly suited for use in the preparation of aviation motor fuels.

In one method which has been proposed for effecting the alkylation reaction the isoparaffin and olefin reactants are intimately contacted in the presence of a liquid sulfuric acid catalyst and the alkymers formed are separated from the catalyst and from unreacted raw material by any appropriate means.

In another specific method for effecting the alkylation reaction advantage is taken of the discovery that the alkylation of an isoparaffin by an olefin, in the presence of a strong acid catalyst of the nature of sulfuric acid, is not a single reaction but is in fact the sum of two entirely distinct reactions which may therefore be separated and each effected under the conditions best suited to it with considerable improvement in operating economy and in the net result obtained.

The two separate reactions which result in the alkylation of an isoparaffin by an olefin in the presence of a strong acid of the sulfuric acid type are: first, the alkylation of the acid by the olefin to form what will for convenience be referred to herein as an "alkylated acid" solution containing free acid, some of the alkyl acid ester of the acid, some polymers and apparently some as yet unidentified compound between the acid and the olefin or a polymer or other reaction product thereof, and second, the reaction of the alkylated acid solution thus produced with the isoparaffin to form an alkyl isoparaffin or alkymer and, with the isoparaffin in substantial excess, to release the acid approximately as it was before alkylation.

The maximum benefits to be derived from the above method of conducting the alkylation reaction in two separate stages are, however, largely dependent upon the specific manner in which each stage is effected and the arrangement of the stages with respect to each other and to other necessary operations in a complete process for producing alkymers boiling in the range of motor fuels from the readily available raw materials. We have found it particularly necessary to insure the full and complete separation of the reaction into the two designated stages. For instance, we have found that after the acid has been used to alkylate the isoparaffin a reasonably efficient separation of the acid and hydrocarbon phases is possible only after impractically long settling times and that after settling periods of 0.5 to 1.5 hours the acid phase will still contain a substantial amount of hydrocarbon material, including both alkymers and unreacted isoparaffin. If this acid is returned to the acid alkylating stage without the removal of these hydrocarbons a substantial amount of undesired side reactions takes place, the returned alkymers are degraded and the operation of the process is made more difficult as will presently be explained. It is accordingly the object of the present invention to provide an improved two-stage process for the alkylation of isoparaffins with olefins by means of a liquid acid of the sulfuric acid type to produce alkymers having high antiknock value wherein provision is made for a more complete isolation of the two stages of the reaction from each other than has hitherto been disclosed.

It is another object of the present invention to provide an improved two-stage process for the alkylation of isoparaffins of low molecular weight with the normally gaseous olefins by means of a liquid acid catalyst of the sulfuric acid type wherein the acid liberated in the hydrocarbon alkylating stage is washed free from the desired products of the reaction and usually also from residual reactants before it is returned to the first or acid alkylating stage.

Other important objects of the invention will be apparent from the following description and the appended claims.

Convenient sources of olefins and isoparaffins in large volume for the production of alkymers of high antiknock value boiling in the range of aviation motor fuels are to be found in the mixtures of $C_5$ and lighter hydrocarbons produced during the cracking of petroleum oils or by the partial dehydrogenation of the appropriate fractions of natural gas. In such mixtures olefins, isoparaffins and normal paraffins usually occur together in proportions determined by the severity of the cracking or dehydrogenation treatment and the specific nature of the oil or natural gas fraction treated. A very convenient and widely available mixture containing an isoparaffin for alkylation and olefins for effecting the alkylation is to be found in the $C_4$ or butane-butene fraction of the hydrocarbons resulting from the cracking of petroleum oils for the production of motor gasoline. While our invention is clearly not so limited it will be explained in terms of such a $C_4$ cut as charging material.

Several specific schemes have been proposed for applying the two-stage method of alkylation to the available hydrocarbon mixtures just enumerated. For instance, a portion of the olefin may be removed by polymerization and the remaining olefin then employed to alkylate the acid catalyst, preferably at a low temperature and with a minimum of contact between the acid and the hydrocarbon when it contains an appreciable concentration of isobutane. The alkylated acid is then used to alkylate the isoparaffin under conditions most favorable to that reaction. A distillation step for the separation of the isoparaffin from the normal paraffin has been variously positioned before the polymerization step, between the polymerization and acid alkylation steps, between the acid alkylation and the hydrocarbon alkylation stages or even after the hydrocarbon alkylation stage. The common feature of alkylating the acid in a first stage under appropriate conditions, using the alkylated acid to alkylate the isoparaffin in a second stage, usually under different conditions, and returning the liberated acid from the second stage to the first stage for realkylation and perpetuation of the cycle is, however, the basis of the two-stage method of effecting the alkylation reaction and is thus common to all of such proposals.

Operation of the present invention is consistent and desirable with any of the foregoing or other systems in which the two-stage principle is employed and, as will be seen from the following more detailed explanation, may be easily accommodated to and made a part of any of the more specific processes. It will thus be appreciated that while, for purposes of explanation and illustration, a $C_4$ or butane-butene fraction of the hydrocarbons resulting from the cracking of petroleum for the production of motor gasoline is employed as the source of olefins and at least a portion of the isoparaffin in a process wherein a specific sequence of distillation and reaction steps is recited, the invention is not limited to this specific sequence or this specific source of hydrocarbons but is applicable to any method of applying the two-stage principle of alkylation hereinabove described. Likewise, while sulfuric acid containing 90 to 100% $H_2SO_4$ will be referred to in the following description and discussion, our invention is equally applicable when other acid catalysts of the sulfuric acid type, such as chlorosulfonic acid, mixed sulfuric and phosphoric acids and mixed chlorosulfonic and phosphoric acids, are employed.

According to one embodiment of the process of the present invention a well fractionated butane-butene cut, as produced, or after appropriate purification for the removal of nitrogen and/or sulfur-containing compounds, may be employed as the hydrocarbon raw material for the alkylation process. This mixture of hydrocarbons is contacted, either in vapor or liquid phase and at as low a temperature as is consistent with the freezing point and viscosity of the acid, with strong sulfuric acid in the acid alkylating stage in an appropriate contactor for effecting mild contact whereby the olefins are reacted with the acid forming alkyl acid sulfates. The unreacted paraffinic hydrocarbons, including both normal and isobutane, are separated from the acid phase which is then contacted in the second stage, preferably at a temperature between 15° and about 150° F., with a large excess of isoparaffin, preferably in liquid phase, in a mechanical contactor capable of producing a high degree of dispersion of the acid in the isobutane. A portion of the isobutane is thus alkylated by the acid solution and the mixture is then passed to a separating zone wherein the aqueous and hydrocarbon phases are substantially separated. The separated acid phase will, even after long standing, however, still contain a considerable amount of hydrocarbon, often as much as several per cent, and it is accordingly a feature of the present invention that the separated acid phase is next passed to a washing zone to be washed with an appropriate liquid hydrocarbon for effecting the removal of the products of the alkylation reaction and other hydrocarbons that may be present as more fully described hereinafter. From the acid washing zone the acid, if substantially free of hydrocarbon, is returned to the acid alkylating or first stage of the two-stage alkylation process. Sometimes when the separation of acid and hydrocarbon is slow an auxiliary separating zone may be necessary. This settling zone may be either the lower portion of the washing tower or an entirely separate vessel as desired.

The process of the present invention may be better understood by reference to the figure of the accompanying drawing wherein one embodiment of the invention is schematically represented. The olefin containing raw material, such as a $C_4$ cut, is passed through line 1 to olefin absorber 3 wherein it is contacted with strong sulfuric acid supplied through line 2 and header 6 as presently to be described. In absorber 3 the olefin is rapidly taken up by the acid and the latter is alkylated with the formation of alkyl acid esters, which in the present instance would be butyl acid sulfates, and other compounds as previously mentioned. Since the absorption of low molecular weight olefins by a strong acid of the sulfuric acid type is a very fast reaction, it is possible to effect the acid alkylation in zone 3 with a minimum of contact between the hydrocarbon and acid phases and it is preferable to operate in that manner in order to suppress undesired reactions that are relatively slower. The alkylated acid solution is passed through line 4 to the hydrocarbon alkylation zone in contactor 8. From absorber 3 the mixture of normal and isobutane may be discharged from the system through line 9 and valve 10 or may be led through lines 9, 11 and 33 to a butane still 34 for subsequent separation. In the absence of the acid washing step of the present invention this hydrocarbon phase from contactor 3 would contain an appreciable quantity of alkymer product from the recycle acid and would thus have to be run through the alkymer stabilizer before passing to the butane still in order to avoid a substantial loss of alkymer product in the normal butane bottoms discharged therefrom.

The alkylated acid collected at 3a is passed through line 4 to a mechanical contactor 8 wherein it is reacted with isobutane from line 7, the two phases being subjected to violent agitation in order to produce a maximum of interfacial contact and thus to promote the alkylation of the isobutane by the alkylated acid solution. The contactor 8 may thus be any form of centrifugal pump, turbo-mixer or the like that is effective to produce a high degree of dispersion of one liquid in another in which it is substantially insoluble. From the contactor 8 the dispersion is passed through line 12 to separator 13 wherein the hydrocarbon and acid phases are substantially separated by gravity or other appropriate means. The hydrocarbon layer which will contain the alkymer product and unreacted isobutane is passed through line 26 to alkymer stabilizer 27 wherein the butanes and any lighter hydrocarbons that may be present are separated from the alkymer products.

The acid phase from separator 13 is passed through line 14 to the acid washing zone comprising a tower 16 and appropriate connecting lines with or without an auxiliary separator at some point, such as 20, following the tower as already discussed. According to one embodiment of the present invention the acid may be washed in this zone with any appropriate hydrocarbon liquid whereby residual hydrocarbons carried from the separator 13 may be removed and prevented from returning with the acid to the acid alkylation reaction in absorber 3. According to a more specific embodiment of the invention the hydrocarbon used in the acid washing zone may be one which is already present in the alkylation system as, for instance, normal butane from line 17, heavy alkymers from line 18, isobutane from line 19 or any appropriate mixture of them. Usually it will be desirable that the wash liquid be free from olefins or other compounds that might react with the acid. Under some circumstances it may be preferable that it contain no substantial amount of isoparaffin though under other conditions it may consist of the isoparaffin being alkylated in the second stage of the process. Generally we have found that either normal butane from the butane still or alkymer bottoms from the alkymer still or a mixture of the two may be used with advantage under any conditions that may be encountered in commercial operation.

In one particular embodiment of the invention in which heavy alkymers from still 45 and line 18 are used as the wash liquid for the acid in the acid washing zone the hydrocarbon phase from tower 16 is led, in part at least, through valve 59 and line 60 to the hydrocarbon alkylating stage in contactor 8. By operating in this manner it has been found possible to repress the formation of heavy alkymers to a worthwhile degree and to produce an improved yield of desirable light product from a given amount of reactants.

The wash tower 16 may take any appropriate form for securing a moderate degree of countercurrent contacting between the acid and the hydrocarbon wash liquid. The acid collected at 16a may be led through line 23 and returned for realkylation through line 2 to absorber 3, or in part so returned and in part removed from the system through valved line 24. Fresh acid may be charged to the acid alkylating contactor 3 through line 2 and valved line 25 to compensate for used acid which is removed. The wash hydrocarbon may be passed from tower 16 through lines 22 and 26 to the alkymer stabilizer 27, or it may be all or in part recirculated to the washing zone through valved line 21 and line 15.

The overhead from alkymer stabilizer 27 may be passed through line 29 and condenser 30 to receiver 31 from whence compounds lighter than butane may be discharged through valved line 32 while a portion of the butane is returned through line 62 to provide reflux liquid in the column. When the paraffin charged through line 7 to the hydrocarbon alkylating contactor 8 is pure isobutane, the residual condensate from 31 may be returned through valved line 57 and line 40 to line 7 and the contactor 8. When, as will more often be the case in actual practice, the butane collected in receiver 31 contains an appreciable amount of normal butane it may be removed through line 33 to butane still 34 wherein the isobutane is separated from the normal butane and passes overhead through line 36 and condenser 37 to receiving drum 38 while the normal butane passes through line 42 and is discharged through valved line 43 or passed in such amount as may be required to line 17 and thence to the acid washing system previously described. A portion of the liquid isobutane collected in receiver 38 may be returned to the column through line 41 while the remainder is passed through line 40 and discharged from the system through valved line 161 or returned through line 40 to line 7 and the contactor 8 as previously described. Receiver 38 is provided with valved exit line 39 for the discharge of gases collecting therein.

While under most conditions it will be found preferable, as previously mentioned, to employ normal butane from butane still 34 and line 42 in the acid washing system just described, it may sometimes be desirable, as for instance when the acid alkylating stage of the process is operated at lower than usual temperature and/or with a minimum of contacting, to employ isobutane as the wash liquid. The required isobutane may then be taken from line 40 through valved line 19 and delivered to the line 15 and contactor 16 for this purpose.

The debutanized alkymer product is led from alkymer stabilizer 27 through line 44 to alkymer still 45 wherein it may be fractionated into any desired fractions as, for instance, an overhead cut of aviation gasoline volatility, which may be led through line 47 and condenser 48 to receiving drum 49, and a bottoms fraction which may be led through line 54 and discharged through valved line 56 or conducted through valve 55 and line 18 to the acid washing system for use alone or with normal or isobutane, as previously mentioned, for washing the acid catalyst. Light alkymers may be in part returned from receiving drum 49 through line 52 to the column while the remainder is discharged through valved line 53.

Since it has been found desirable to maintain a high concentration of isobutane in the isoparaffin alkylation stage, in contactor 8, it will frequently be found necessary to add isobutane from an external source as, for instance, through valve 58 to line 7. We have found that for best results the concenration of isobutane in the hydrocarbon phase in this zone should be above 50% and preferably of the order of 70% by volume. It has also been found desirable to regulate the passage of olefin and acid to the acid alkylating zone so that the concentration of alkyl acid sulfate in the acid is maintained at the optimum value for producing the maximum yield of the desired product. This value may vary over a rather wide range, depending upon the particular combination of operating conditions being employed, but should seldom be above 20% by weight of the acid and usually should be kept very considerably below that figure. Sometimes it may be desirable in order to reduce the size of equipment and the quantity of acid circulated to operate the acid alkylating stage so as to build up a high concentration of alkyl acid ester in the acid and then to dilute this solution with acid recycled from the hydrocarbon alkylation stage. The acid thus used for dilution obviously need not be washed and may thus be returned direct from the separator 13 to line 4 through a line, which for simplicity has been omitted from the drawing.

Obviously, neither the isoparaffin concentration in the hydrocarbon phase nor the alkyl acid sulfate concentration in the acid phase is of any substantial significance in the absence of a large interface between the phases through which reaction can be effected. However, when the molecular ratio of isobutane to butyl acid sulfate is maintained above about 100 to 1 and preferably between about 100 and 700 to 1 in the reaction zone a reasonable degree of vigorous agitation in contactor 8 will be found adequate to insure completion of the alkylation reaction without undue side reactions.

The term "light alkymer product" as employed in the appended claims is intended to mean any alkymer product containing a substantial amount of components boiling in the range of aviation gasoline and below about 350° F.

Having now disclosed an improved method of operating a two-stage process for the alkylation of isoparaffins with olefins by means of a liquid acid catalyst, we claim:

1. Process of alkylating an isoparaffin for the production of isoparaffins of higher molecular weight which comprises reacting an acid alkylation catalyst with an olefin and forming thereby an alkyl acid ester in a first zone under conditions regulated to favor said reaction and to suppress other possible reactions, withdrawing the resulting alkylated acid catalyst containing alkyl acid ester from said first zone, alkylating an isoparaffin with said alkylated acid catalyst in a second zone under conditions favorable to said alkylation whereby an isoparaffin of higher molecular weight is produced and acid alkylation catalyst is liberated, effecting a substantial separation of hydrocarbon from said liberated acid alkylation catalyst, removing said separated acid to a washing zone, washing said acid alkylation catalyst in said washing zone with a liquid hydrocarbon comprising normal butane to substantially free it of light alkymer product contained therein, separating the liquid hydrocarbon wash from the washed acid alkylation catalyst, passing a portion of the separated hydrocarbon wash liquid to an alkymer stabilizer wherein alkymers and butanes are separated and returning at least a portion of the washed acid alkylation catalyst to the aforesaid first zone for realkylation.

2. Process of alkylating an isoparaffin for the production of isoparaffins of higher molecular weight which comprises reacting an acid alkylation catalyst with an olefin and forming thereby an alkyl acid ester in a first zone under conditions regulated to favor said reaction and to suppress other possible reactions, withdrawing the resulting alkylated acid catalyst containing alkyl acid ester from said first zone, alkylating an isoparaffin with said alkylated acid catalyst in a second zone under conditions favorable to said alkylation whereby an isoparaffin of higher molecular weight is produced and acid alkylation catalyst is liberated, effecting a substantial separation of hydrocarbon from said liberated acid alkylation catalyst, removing said separated acid to a washing zone and therein washing said acid alkylation catalyst with a liquid hydrocarbon comprising heavy alkymers to substantially free it of light alkymer product contained therein.

3. Process of alkylating an isoparaffin for the production of isoparaffins of higher molecular weight which comprises reacting an acid alkylation catalyst with an olefin and forming thereby an alkyl acid ester in a first zone under conditions regulated to favor said reaction and to suppress other possible reactions, withdrawing the resulting alkylated acid catalyst containing alkyl acid ester from said first zone, alkylating an isoparaffin with said alkylated acid catalyst in a second zone under conditions favorable to said alkylation whereby an isoparaffin of higher molecular weight is produced and acid alkylation catalyst is liberated, effecting a preliminary separation of said liberated acid alkylation catalyst, removing said separated acid to a washing zone, washing said acid alkylation catalyst in said washing zone with a liquid hydrocarbon comprising a fraction of the heavy alkymers produced in the process to substantially free it of light alkymer product contained therein, separating the liquid hydrocarbon wash from the washed acid alkylation catalyst, passing a portion of the separated hydrocarbon wash liquid to the aforesaid second zone wherein the isoparaffin alkylation reaction is effected and returning at least a portion of the washed acid alkylation catalyst to the aforesaid first zone for realkylation.

LAVERNE P. ELLIOTT.
LLOYD F. BROOKE.